United States Patent
Fukumoto et al.

(10) Patent No.: US 7,536,090 B2
(45) Date of Patent: May 19, 2009

(54) HAND SHAKE BLUR CORRECTING APPARATUS

(75) Inventors: Shinpei Fukumoto, Moriguchi (JP); Hiroshi Kano, Moriguchi (JP); Hideto Fujita, Moriguchi (JP); Haruo Hatanaka, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 295 days.

(21) Appl. No.: 11/523,653

(22) Filed: Sep. 20, 2006

(65) Prior Publication Data
US 2007/0065130 A1 Mar. 22, 2007

(30) Foreign Application Priority Data
Sep. 22, 2005 (JP) .............................. 2005-275280

(51) Int. Cl.
*G03B 17/00* (2006.01)

(52) U.S. Cl. ........................ 396/52; 396/55; 348/208.99

(58) Field of Classification Search .................. 396/52, 396/55, 53, 54, 421, 205, 206, 301, 303; 73/570; 352/53; 348/208.99, 341, 208.1, 348/208.2, 208.5, 208.6, 208.4, E5.046
See application file for complete search history.

(56) References Cited

U.S. PATENT DOCUMENTS

| | | | | |
|---|---|---|---|---|
| 6,137,956 | A * | 10/2000 | Satoh et al. | 396/55 |
| 2005/0195295 | A1 | 9/2005 | Kawai | |
| 2005/0231603 | A1 * | 10/2005 | Poon | 348/208.99 |
| 2006/0110147 | A1 * | 5/2006 | Tomita et al. | 396/55 |
| 2007/0165961 | A1 * | 7/2007 | Lu | 382/254 |

FOREIGN PATENT DOCUMENTS

| | | |
|---|---|---|
| JP | 07-226905 | 8/1995 |
| JP | 10-215405 | 8/1998 |
| JP | 11-024122 | 1/1999 |
| JP | 11-027574 | 1/1999 |
| JP | 2000-298300 | 10/2000 |
| JP | 2004-088567 | 3/2004 |
| JP | 2005-252626 A | 9/2005 |

* cited by examiner

*Primary Examiner*—Reena Aurora
(74) *Attorney, Agent, or Firm*—NDQ & M Watchstone LLP

(57) ABSTRACT

A hand shake blur signal reduction means for reducing the hand shake blur signal using given reduction ratio in the horizontal direction and reduction ratio in the vertical direction; an image restoration filter generating means for generating the image restoration filter based on the hand shake blur signal reduced by the hand shake blur signal reduction means; an image reduction means for reducing the hand shake blur image at the reduction ratio same as the reduction ratios in the horizontal direction and the vertical direction used in reducing the hand shake blur signal in the hand shake blur signal reduction means; an image restoration means for performing image restoration on the hand shake blur image reduced by the image reduction means using the image restoration filter generated by the image restoration filter generating means; and an image enlargement means for generating the restored image for the hand shake blur image by enlarging the restored image restored by the image restoration means are arranged.

14 Claims, 8 Drawing Sheets

HAND SHAKE BLUR CORRECTING APPARATUS

BACKGROUND OF THE INVENTION

1. Field of the Invention

The present invention relates to a hand shake blur correcting apparatus.

2. Description of the Related Art

A still image hand shake blur correction technique is a technique for reducing hand shake blur in still image shooting, and is achieved by detecting the hand shake blur and stabilizing the image based on the detected result.

A method of detecting the hand shake blur includes a method of using a hand shake blur sensor (angular velocity sensor), and an electronic method of detecting by analyzing the image. The method of stabilizing the image may be an optical method in which the lens and imaging sensors are stabilized, or an electronic method in which the blur caused by hand shake is removed through image processing.

The completely electronic hand shake blur correction technique, that is, a technique of generating the image in which hand shake blur is removed by analyzing and processing only one photographed hand shake blur image has not reached the practical level. In particular, obtaining a hand shake blur signal of a precision obtained by a hand shake blur sensor is difficult by analyzing one hand shake blur image.

Therefore, it is realistic to detect the hand shake blur using the hand shake blur sensor, and to remove the hand shake blur through image processing using the hand shake blur data. The removal of blur through image processing is referred to as image restoration. The method including the hand shake blur sensor and the image restoration is herein referred to as an electronic hand shake blur correction. A method of correcting the image by detecting the hand shake blur using the hand shake blur sensor and driving the optical system (lens, imaging sensors) is referred to as an optical hand shake blur correction. The electronic hand shake blur correction has merits in terms of cost, size, power consumption compared to the optical hand shake blur correction. The present invention relates to the electronic hand shake blur correction.

If the degradation process of the image such as hand shake blur and out of focus is definite, the degradation can be alleviated by using an image restoration filter referred to as a Wiener filter or a generalized inverse filter. The image restoration filter is generally configured by a two-dimensional FIR filter. When the hand shake blur correction device is realized with a hardware, the size of the two-dimensional FIR filter has the upper limit value of the tap size fixed due to the restriction of the hardware. Thus, when the hand shake blur size becomes large to greater than or equal to a constant value, all the coefficient components of the image restoration filter cannot fall within the number of taps of the two-dimensional FIR filter, and the corrective effect lowers. Thus, the upper limit value of the hand shake blur size that can be performed with image restoration becomes limited.

SUMMARY OF THE INVENTION

The present invention aims to provide a hand shake blur correcting apparatus that obtains sufficient corrective effect even when the hand shake blur size is large.

The first hand shake blur correcting apparatus according to the present invention is hand shake blur correcting apparatus for generating an image restoration filter based on a hand shake blur signal and performing image restoration on the hand shake blur image using the generated image restoration filter; the hand shake blur correcting apparatus including a hand shake blur signal reduction means for reducing the hand shake blur signal using given reduction ratio in the horizontal direction and reduction ratio in the vertical direction; an image restoration filter generating means for generating the image restoration filter based on the hand shake blur signal reduced by the hand shake blur signal reduction means; an image reduction means for reducing the hand shake blur image at the reduction ratio same as the reduction ratios in the horizontal direction and the vertical direction used in reducing the hand shake blur signal in the hand shake blur signal reduction means; an image restoration means for performing image restoration on the hand shake blur image reduced by the image reduction means using the image restoration filter generated by the image restoration filter generating means; and an image enlargement means for generating the restored image for the hand shake blur image by enlarging the restored image restored by the image restoration means.

The hand shake blur signal reduction means used determines, for example, the reduction ratio in the horizontal direction and the reduction ratio in the vertical direction set in advance, and reduces the hand shake blur signal using the determined reduction ratio in the horizontal direction and reduction ratio in the vertical direction.

The hand shake blur signal reduction means used determines, for example, the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

The second hand shake blur correcting apparatus according to the present invention is a hand shake blur correcting apparatus for generating an image restoration filter based on a hand shake blur signal and performing image restoration on the hand shake blur image using the generated image restoration filter; the hand shake blur correcting apparatus including a hand shake blur signal reduction means for reducing the hand shake blur signal using given reduction ratio in the horizontal direction and reduction ratio in the vertical direction; an image restoration filter generating means for generating the image restoration filter based on the hand shake blur signal reduced by the hand shake blur signal reduction means; an image decomposition means for decomposing the hand shake blur image into a plurality of decimated images; an image restoration means for performing image restoration on each decimated image decomposed by the image decomposition means using the image restoration filter generated by the image restoration filter generating means; and an image synthesis means for generating the restored image for the hand shake blur image by synthesizing each restored image restored by the image restoration means.

The hand shake blur signal reduction means used determines, for example, the reduction ratio in the horizontal direction and the reduction ratio in the vertical direction set in advance, and reduces the hand shake blur signal using the determined reduction ratio in the horizontal direction and reduction ratio in the vertical direction.

The hand shake blur signal reduction means used determines, for example, the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

The image decomposition means used decomposes, for example, the hand shake blur image into decimated images of the number taking the reduction ratios in the horizontal direction and the vertical direction used in reducing the hand shake blur signal by the hand shake blur signal reduction means into consideration.

The third hand shake blur correcting apparatus according to the present invention is a hand shake blur correcting apparatus for generating an image restoration filter based on a hand shake blur signal and performing image restoration on the hand shake blur image using the generated image restoration filter; the hand shake blur correcting apparatus including a hand shake blur size determining means for determining whether the hand shake blur size is large or small by comparing the hand shake blur signal with a predetermined threshold value; a first hand shake blur correcting means for executing the hand shake blur correcting process by a first mode when the hand shake blur size is determined as small by the hand shake blur size determining means; and a second hand shake blur correcting means for executing the hand shake blur correcting process by a second mode when the hand shake blur size is determined as large by the hand shake blur size determining means; wherein the first hand shake blur correcting means includes, a first image restoration filter generating means for generating an image restoration filter based on the hand shake blur signal, and a first image restoration means for performing image restoration on the hand shake blur image using the image restoration filter obtained by the first image restoration filter generating means; the second hand shake blur correcting means includes, a hand shake blur signal reduction means for reducing the hand shake blur signal using given reduction ration in the horizontal direction and reduction ratio in vertical direction, a second image restoration filter generating means for generating an image restoration filter based on the hand shake blur signal reduced by the hand shake blur signal reduction means, an image reduction means for reducing the hand shake blur image at reduction ratios same as the reduction ratios in the horizontal direction and the vertical direction used in reducing the hand shake blur signal by the hand shake blur signal reduction means, a second image restoration means for performing image restoration on the hand shake blur image reduced by the image reduction means using the image restoration filter generated by the second image restoration filter generating means, and an image enlargement means for generating the restored image for the hand shake blur image by enlarging the restored image restored by the second image restoration means.

The hand shake blur signal reduction means used determines, for example, the reduction ratio in the horizontal direction and the reduction ratio in the vertical direction set in advance, and reduces the hand shake blur signal using the determined reduction ratio in the horizontal direction and reduction ratio in the vertical direction.

The hand shake blur signal reduction means used determines, for example, the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

The fourth hand shake blur correcting apparatus according to the present invention is a hand shake blur correcting apparatus for generating an image restoration filter based on a hand shake blur signal and performing image restoration on the hand shake blur image using the generated image restoration filter; the hand shake blur correcting apparatus including a hand shake blur size determining means for determining whether the hand shake blur size is large or small by comparing the hand shake blur signal with a predetermined threshold value; a first hand shake blur correcting means for executing the hand shake blur correcting process by a first mode when the hand shake blur size is determined as small by the hand shake blur size determining means; and a second hand shake blur correcting means for executing the hand shake blur correcting process by a second mode when the hand shake blur size is determined as large by the hand shake blur size determining means; wherein the first hand shake blur correcting means includes, a first image restoration filter generating means for generating an image restoration filter based on the hand shake blur signal, and a first image restoration means for performing image restoration on the hand shake blur image using the image restoration filter obtained by the first image restoration filter generating means; the second hand shake blur correcting means includes, a hand shake blur signal reduction means for reducing the hand shake blur signal using given reduction ration in the horizontal direction and reduction ratio in vertical direction, a second image restoration filter generating means for generating an image restoration filter based on the hand shake blur signal reduced by the hand shake blur signal reduction means, an image decomposition means for decomposing the hand shake blur image into a plurality of decimated images, a second image restoration means for performing image restoration on each decimated image decomposed by the image decomposition means using the image restoration filter generated by the second image restoration filter generating means, and an image synthesis means for generating the restored image for the hand shake blur image by synthesizing each restored image restored by the second image restoration means.

The hand shake blur signal reduction means used determines, for example, the reduction ratio in the horizontal direction and the reduction ratio in the vertical direction set in advance, and reduces the hand shake blur signal using the determined reduction ratio in the horizontal direction and reduction ratio in the vertical direction.

The hand shake blur signal reduction means used determines, for example, the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

The image decomposition means used decomposes the hand shake blur image into decimated images of the number taking the reduction ratios in the horizontal direction and the vertical direction used in reducing the hand shake blur signal by the hand shake blur signal reduction means into consideration.

DETAILED DESCRIPTION OF THE PREFERRED EMBODIMENTS

Examples 1, 2 of when the present invention is applied to the digital camera will now be described with reference to the drawings.

[A] EXAMPLE 1

[1] Configuration of Hand Shake Blur Correction Processing Circuit

Figure 1:
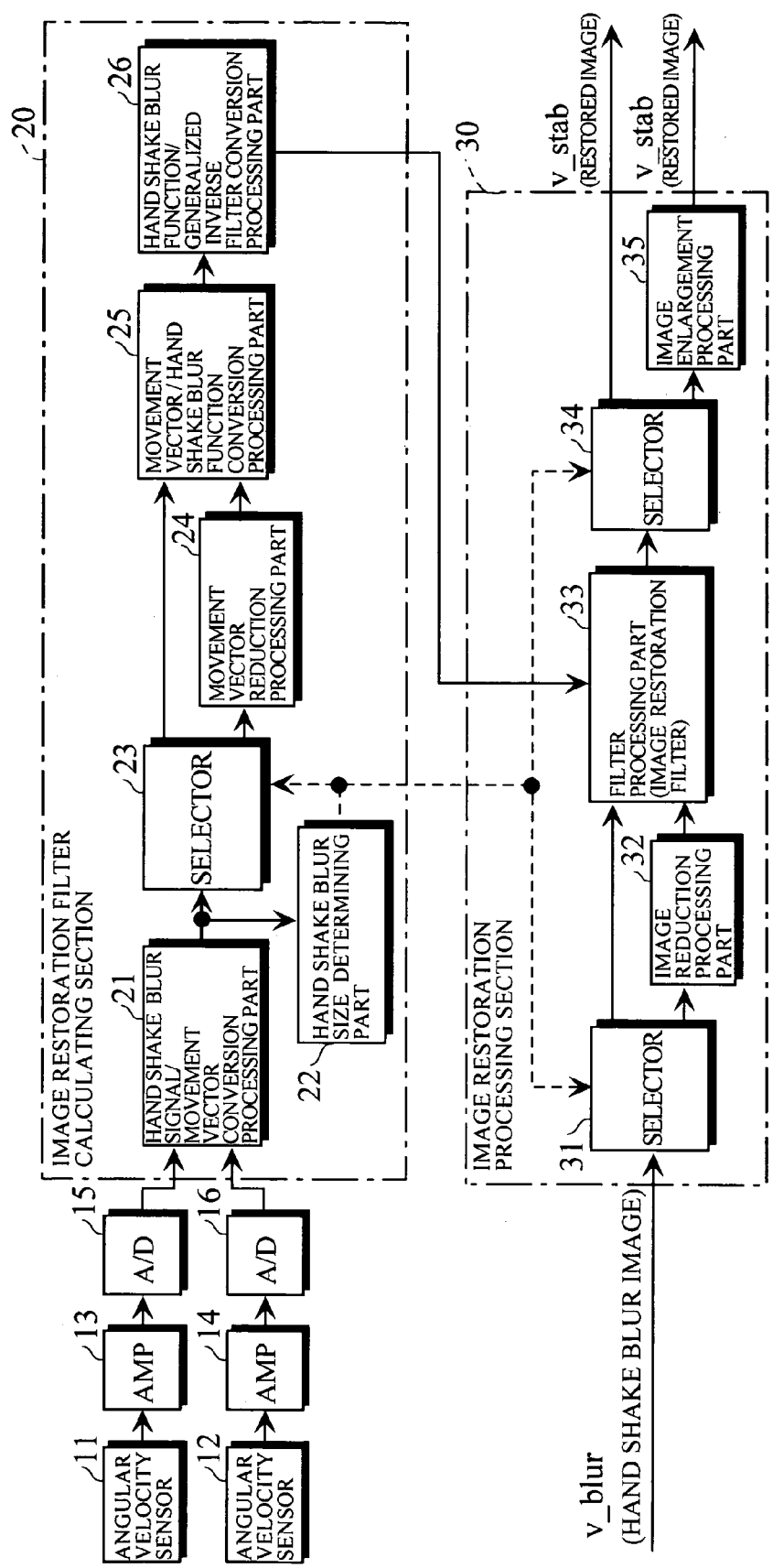
FIG. 1 is a block diagram showing a configuration of a hand shake blur correction processing circuit arranged in a digital camera.

FIG. 1 shows the configuration of the hand shake blur correction processing circuit arranged in the digital camera.

The angular velocity sensors 11, 12 are arranged to detect the angular velocity of the camera. One angular velocity sensor 11 detects the angular velocity in the pan direction of the camera, and the other angular velocity sensor 12 detects the angular velocity in the tilt direction of the camera. The output signal of each angular velocity sensor 11, 12 is respectively amplified by the amplifier 13, 14, and then converted to digital data by the A/D converters 15, 16.

The hand shake blur correction processing circuit includes an image restoration filter calculating section 20 and an image restoration processing section 30. The image restoration filter calculating section 20 calculates the coefficient of the image restoration filter (generalized inverse filter) based on the angular velocity data in the pan direction and the angular velocity data in the tilt direction. The image restoration processing section 30 performs the image restoration process on the imaged image (hand shake blur image) v_blur based on the coefficient calculated by the image restoration filter calculating section 20.

The image restoration filter calculating section 20 and the image restoration processing section 30 will now be described.

[2] Description on Image Restoration Filter Calculating Section 20

The image restoration filter calculating section 20 includes a hand shake blur signal/movement vector conversion processing part 21, a hand shake blur size determining part 22, a selector 23, a movement vector reduction processing part 24, a movement vector/hand shake blur function conversion processing part 25, and a hand shake blur function/generalized inverse filter conversion processing part 26.

[2-1] Description on Hand Shake Blur Signal/Movement Vector Conversion Processing Part 21

The hand shake blur signal/movement vector conversion processing part 21 converts the angular velocity data (hand shake blur signal) detected by the angular velocity sensors 11, 12 to the movement vector.

The original data of the hand shake blur is the output data of the angular velocity sensors 11, 12 between the start of shooting and the end of shooting. The angular velocities in the pan direction and the tilt direction are measured in a predetermined sampling interval dt[sec] with the start of shooting by synchronizing with the exposure period of the camera using the angular velocity sensors 11, 12, and the data up to the end of shooting is obtained. The sampling interval dt[sec] is, for example, 1 msec.

Figure 2:
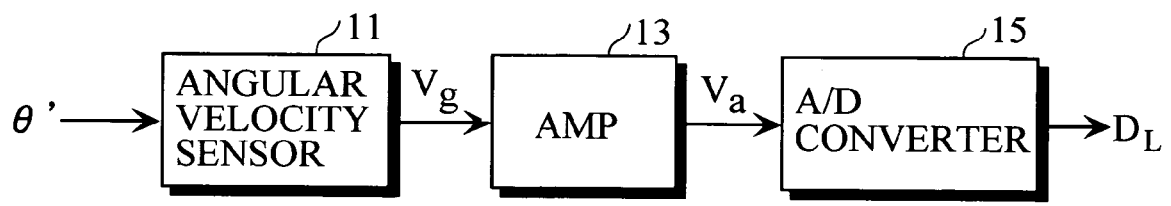
FIG. 2 is a block diagram showing an amplifier for amplifying the output of the angular velocity sensor 11, and an A/D converter for converting the amplifier output to a digital value.

As shown in FIG. 2, the angular velocity θ'[deg/sec] in the pan direction of the camera is converted to the voltage $V_g$[mV] by the angular velocity sensor 11, and then amplified by the operational amplifier 13. The voltage $V_a$[mV] output from the operational amplifier 13 is converted to the digital value $D_L$ [step] by the A/D converter 15. In order to convert the data obtained as the digital value to the angular velocity, calculation is performed using the sensor sensitivity S[mV/deg/sec], the amplifier magnification K[times], and the A/D conversion coefficient L[mV/step].

The voltage value $V_g$[mV] obtained by the angular velocity sensor 11 is proportional to the value of the angular velocity θ'[deg/sec]. The proportionality constant at this point is the sensor sensitivity, and thus $V_g$[mV] is expressed by equation (1).

$$V_g = S\theta' \tag{1}$$

Since the operational amplifier 13 simply amplifies the voltage value, the amplified voltage $V_a$[mV] is expressed by equation (2).

$$V_a = KV_g \tag{2}$$

The voltage value $V_a$[mV] amplified by the operational amplifier 13 is A/D converted, and expressed using the digital value $D_L$[step] of n[step] (e.g., −512 to 512). If the A/D conversion coefficient is L[mV/step], the digital value $D_L$ [step] is expressed by equation (3).

$$D_L = V_a / L \tag{3}$$

As shown in equation (4), the angular velocity is obtained from the sensor data using equations (1) to (3).

$$\theta' = (L/KS)D_L \tag{4}$$

How much shake is produced on the photographed image is calculated from the angular velocity data during shooting. The apparent movement on the image is referred to as the movement vector.

The panning amount produced at the camera from one sample value to the next sample value of the angular data is assumed as θ[deg]. The θ[deg] is expressed by equation (5) assuming that the camera pans at a constant angular velocity and the sampling frequency is f=1/dt[Hz].

$$\theta = \theta'/f = (L/KSf)D_L \tag{5}$$

Figure 3:
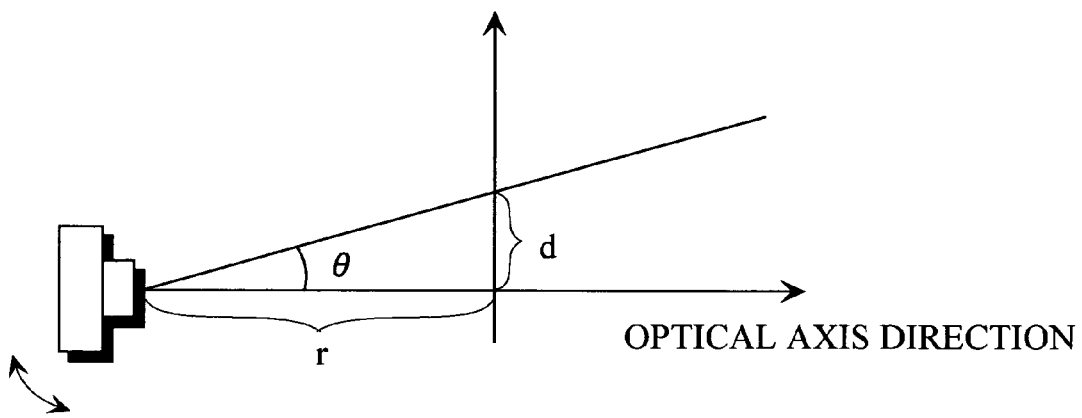
FIG. 3 is a frame format view showing the relationship between panning amount θ [deg] of the camera and movement amount d[mm] on the screen.

As shown in FIG. 3, if r[mm] is the focal distance (35 [mm] film conversion), the movement amount d[mm] on the screen is obtained by equation (6) from the panning amount θ[deg] of the camera.

$$d = r \tan \theta \tag{6}$$

The movement amount d[mm] obtained here is the size of the hand shake blur in the 35 [mm] film conversion and the unit is in [mm]. When actually performing the calculation process, the size of the image must be considered in the unit [pixel] of the size of the image of the digital camera.

Figure 4:
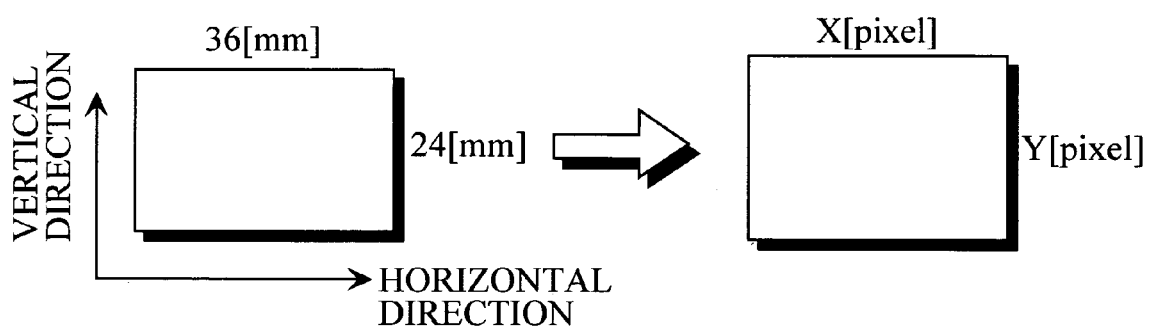
FIG. 4 is a frame format view showing an image size of 35[mm] film conversion and an image size of digital camera.

Since the image of the 35 [mm] film conversion and the image in unit of [pixel] photographed with the digital camera have different aspect ratio, the following calculation must be performed. As shown in FIG. 4, the image is known to be 36 [mm] by 24 [mm] in the 35 [mm] film conversion. If the size of the image photographed with the digital camera is X[pixel]×Y[pixel], the shake in the horizontal direction (pan direction) is x[pixel], and the shake in the vertical direction (tilt direction) is y[pixel], the conversion equation becomes equations (7) and (8).

$$x = d_x(X/36) = r \tan \theta_x (X/36) \quad (7)$$

$$y = d_y(Y/24) = r \tan \theta_y (Y/24) \quad (8)$$

The suffixes x and y are used for d and θ in equations (7) and (8), where the suffix x indicates the value in the horizontal direction and the suffix y indicates the value in the vertical direction.

Summarizing equations (1) to (8), the shake in the horizontal direction (pan direction) x[pixel] and the shake in the vertical direction (tilt direction) y[pixel] are expressed by equations (9) and (10).

$$x = r \tan \{(L/KSf)D_{Lx}\} X/36 \quad (9)$$

$$y = r \tan \{(L/KSf)D_{Ly}\} Y/24 \quad (10)$$

The hand shake blur signal (movement vector) showing the shake amount of the image is obtained from the angular velocity data of each axis of the camera obtained as the digital value by using conversion equations (9) and (10).

The movement vector during shooting can be obtained for the number of data of the angular velocity obtained from the sensor (number of sample points), and the trajectory of the hand shake blur on the image is obtained by connecting the starting point and the end point in order. The speed of the hand shake blur at a certain point in time becomes apparent by looking at the size of each vector.

[2-2] Description on Hand Shake Blur Size Determining Part 22

The hand shake blur size determining part 22 determines whether or not the hand shake blur size is large based on the movement vector obtained by the hand shake blur signal/movement vector conversion processing part 21, and controls the selector 23 in the image restoration filter calculating section 20 and the selectors 31, 34 in the image restoration processing section 30 according to the determination result.

Figure 5:
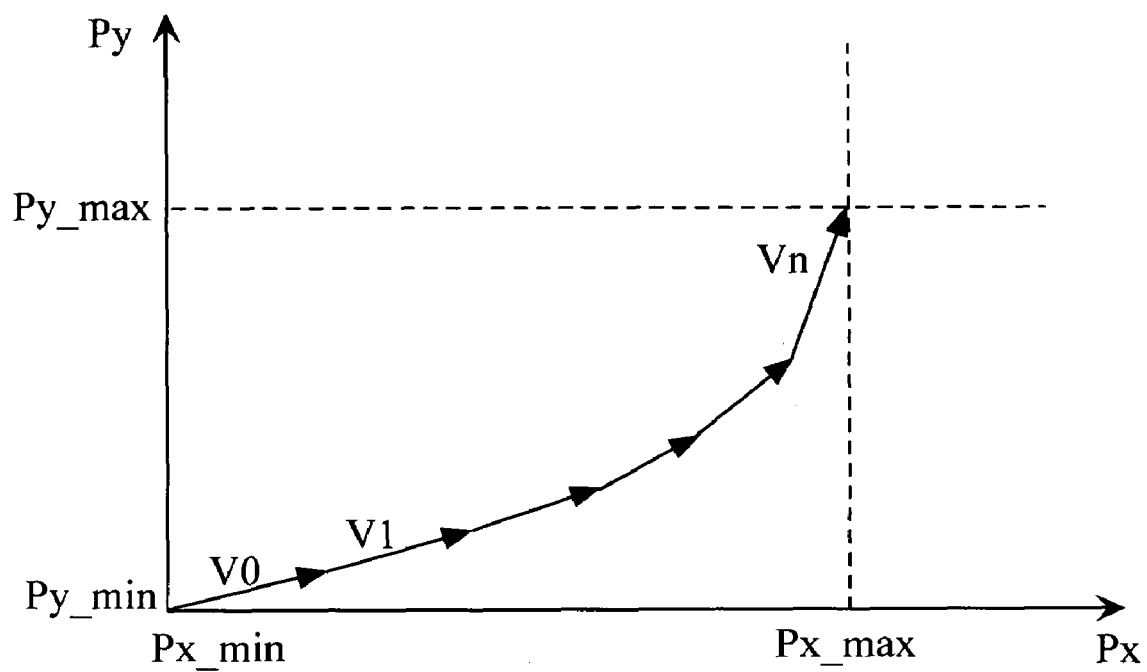
FIG. 5 is a frame format view showing the trajectory of the hand shake blur obtained from the movement vectors V0, V1, . . . , Vn for every sampling period in shooting.

The movement vector for every sampling period during shooting is assumed as V0, V1, . . . , Vn; the horizontal component of each vector as Vx0, Vx1, . . . , Vxn; and the vertical component of each vector as Vy0, Vy1, . . . , Vyn. As shown in FIG. 5, the trajectory of the hand shake blur within the shooting period is obtained by sequentially adding the movement vectors V0, V1, . . . , Vn for every sampling period during shooting. The minimum value Px_min and the maximum value Px_max in the horizontal direction (Px) and the minimum value Py_min and the maximum value Py_max in the vertical direction (Py) are obtained from the trajectory of the hand shake blur. The size Sz_h of the hand shake blur in the horizontal direction and the size Sz_v of the hand shake blur in the vertical direction are calculated from equation (11).

$$Sz\_h = Px\_\max - Px\_\min$$

$$Sz\_v = Py\_\max - Py\_\min \quad (11)$$

The size (Sz_h, Sz_v) of the hand shake blur in each direction are then compared with the threshold value Th. If both sizes (Sz_h, Sz_v) of the hand shake blur are less than or equal to the threshold value Th, the hand shake blur size is determined as small. If at least one size (Sz_h, Sz_v) of the hand shake blur is larger than the threshold value Th, the hand shake blur size is determined as large.

The hand shake blur size determining part 22 controls the selector 23 so that the movement vector obtained by the hand shake blur signal/movement vector conversion processing part 21 is sent to the movement vector/hand shake blur function conversion processing part 25 when the hand shake blur size is determined as small. When the hand shake blur size is determined as large, the hand shake blur size determining part 22 controls the selector 23 so that the movement vector obtained by the hand shake blur signal/movement vector conversion processing part 21 is sent to the movement vector reduction processing part 24.

[2-3] Description on Movement Vector Reduction Processing Part 24

The movement vector reduction processing part 24 reduces each movement vector by multiplying the reduction ratio Scale_x in the horizontal direction to the horizontal component and the reduction ratio Scale_y to the vertical component of each movement vector (hand shake blur signal) obtained by the hand shake blur signal/movement vector conversion processing part 21. The reduction ratio is set so that the size (Sz_h, Sz_v) of the hand shake blur in each direction each becomes less than or equal to the threshold value Th. The reduction ratio is also preferably set so that the size of the hand shake blur in each direction after reduction is not greatly reduced compared to the threshold value Th.

In the present example, the reduction ratios Scale_x, Scale_y are set to a value that becomes one over an integer, as shown in equation (12).

$$Scale\_x = 1/Div\_x$$

$$Scale\_y = 1/Div\_y \quad (12)$$

In equation (12), Div_x and Div_y are integers. The values of Div_x and Div_y may be appropriately determined according to the size (Sz_h, Sz_v) of the hand shake blur in the corresponding direction, but is defined as "2" in advance herein. If Div_x=Div_y=2, then Scale_x=Scale_y=1/2.

Assuming the movement vector for every sampling period during shooting is V0, V1, . . . , Vn; the horizontal component of each vector is Vx0, Vx1, . . . , Vxn; and the vertical component of each vector is Vy0, Vy1, . . . , Vyn, the movement vector V0', V1', . . . , Vn' after reduction is expressed by equation (13).

$$V0' = (Vx0 \times Scale\_x, Vy0 \times Scale\_y)$$

$$V1' = (Vx1 \times Scale\_x, Vy1 \times Scale\_y)$$

$$\ldots$$

$$Vn' = (Vxn \times Scale\_x, Vyn \times Scale\_y) \quad (13)$$

The movement vector obtained by the movement vector reduction processing part 24 is sent to the movement vector/hand shake blur function conversion processing part 25.

[2-4] Description on Movement Vector/Hand Shake Blur Function Conversion Processing Part 25

The hand shake blur can be expressed with a spatial filter. When the elements of the operator are weighed and the spatial filter processing is performed in accordance with the trajectory (trajectory drawn by a certain point on the image when the camera is shaken, the shake amount of the image) of the hand shake blur shown on the left side of FIG. 6, the hand shake blur image can be created since only the concentration values of the neighboring pixels in which the concentration value of the pixel corresponds to the trajectory of the hand shake blur is taken into consideration in the filtering process.

The operator weighed according to the trajectory is referred to as Point Spread Function (PSF), and is used as a mathematical model of the hand shake blur. The weight of each element of the PSF is a value proportional to the time in which the relevant element passes the hand shake blur trajectory, and is a value standardized so that the sum of the weight of each element becomes 1. That is, the weight is proportional to the inverse number of the size of the movement vector. When considering the influence of the hand shake blur on the image, a greater influence is made on the image at where the movement is slow.

Figure 6:
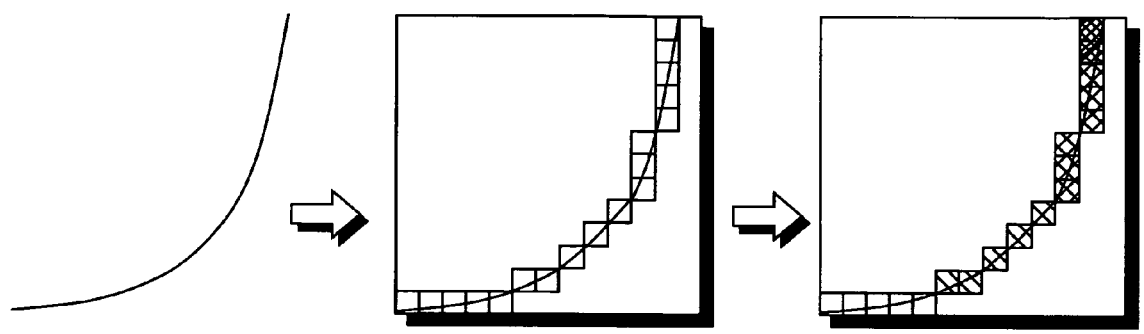
FIG. 6 is a frame format view showing a spatial filter (PSF) expressing the hand shake blur.

The center of FIG. 6 shows the PSF of when the movement of the hand shake is a constant speed, and the right side of FIG. 6 shows the PSF of when the size of the movement of the actual hand shake is considered. According to the right side of FIG. 6, the element of low weight (size of movement vector is large) of the PSF is shown black, and the element of high weight (size of movement vector is small) is shown white.

The movement vector (shake amount of image) obtained in [2-1] includes the trajectory of the hand shake blur and the speed of the trajectory as data.

In creating the PSF, the element to be applied with the weight of the PSF is determined from the trajectory of the hand shake blur. The weight to be applied to the element of the PSF is determined from the speed of the hand shake blur.

The trajectory of the broken line approximated hand shake blur is obtained by connecting a series of movement vectors obtained in [2-1]. This trajectory has a precision to after the decimal point, but the element to be applied with the weight of the PSF is determined by making it an integer. To this end, the element to be applied with the weight in the PSF is determined using the line drawing algorithm of Bresenham in the present example. The line drawing algorithm of Bresenham is an algorithm of selecting a suitable dot position when desiring to draw a line that passes through two arbitrary points on the digital screen.

Figure 7:
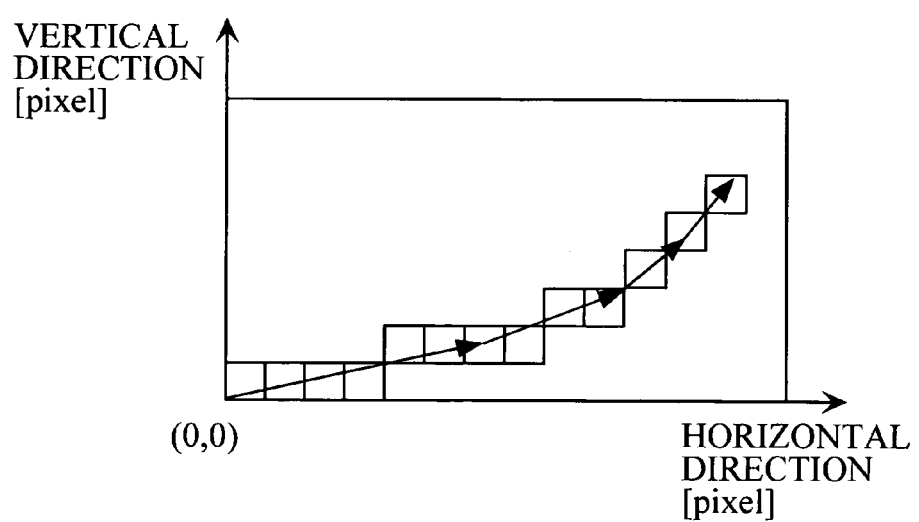
FIG. 7 is a frame format view for explaining a line drawing algorithm of Bresenham.

The line drawing algorithm of Bresenham will now be described using an example of FIG. 7. In FIG. 7, the line with an arrow indicates the movement vector.

(a) Starting from the origin (0, 0) of the dot position, the element in the horizontal direction of the movement vector is increased by one.
(b) The position in the vertical direction of the movement vector is checked, and if such position in the vertical direction is greater than one compared to the previous position in the vertical direction of the dot, the vertical direction of the dot position is increased by one.
(c) The element in the horizontal direction of the movement vector is again increased by one.

The line where the movement vector passes can be expressed with the dot position by repeating the above processes until the end of the movement vector.

Figure 8:
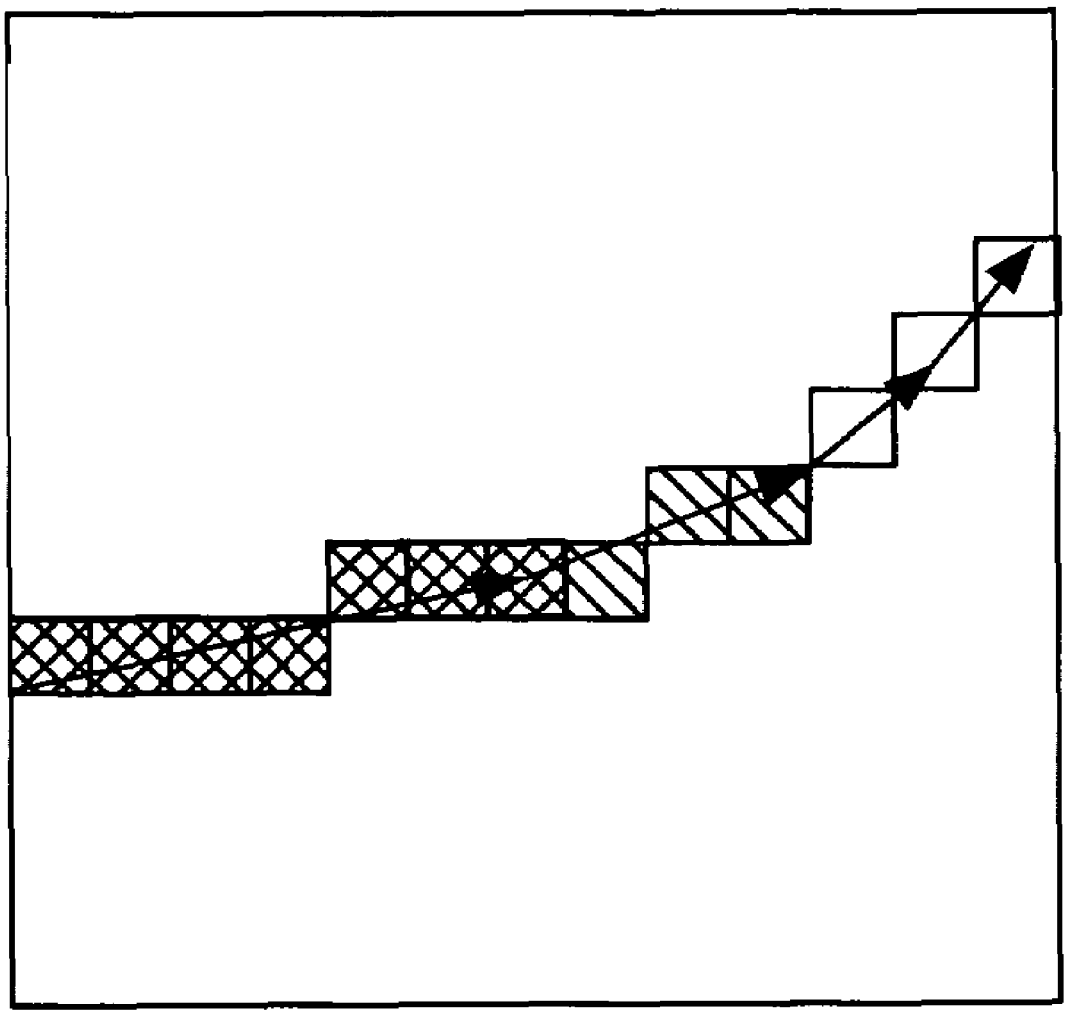
FIG. 8 is a frame format view showing the PSF obtained by the movement vector of FIG. 7.

The weight applied to the element of the PSF is determined using the fact that the size (speed component) of the vector differs for each movement vector. The weight takes an inverse number of the size of the movement vector, and the weight is substituted to the element corresponding to each movement vector. However, the weight of each element is standardized so that the sum of the weight of each element becomes 1. FIG. 8 shows the PSF obtained by the movement vector of FIG. 7. The weight becomes smaller where the speed is fast (where the movement vector is long), and the weight becomes larger at where the speed is slow (where the movement vector is short).

The movement vector/hand shake blur function conversion processing part 25 creates the PSF based on the movement vector obtained by the hand shake blur signal/movement vector conversion processing part 21 when determined that the hand shake blur size is small by the hand shake blur size determining part 22. If determined that the hand shake blur size is large by the hand shake blur size determining part 22, the PSF is created based on the movement vector reduced by the movement vector reduction processing part 24.

[2-5] Description on Hand Shake Blur Function/Generalized Inverse Filter Conversion Processing Part 26

The image is assumed to be digitalized at a resolution of Nx pixels in the horizontal direction, and Ny pixels in the vertical direction. The value of the pixel at the $i^{th}$ position in the horizontal direction and the $j^{th}$ position in the vertical direction is expressed as p(i,j). The conversion of the image by the spatial filter means modeling the conversion through convolution of the neighboring pixels of the pixel of interest. The coefficient of convolution is h(l,m). Assuming −n<l, m<n for the sake of simplicity, the conversion of the pixel of interest can be expressed by equation (14). The h(l,m) itself is also referred to as the spatial filter, or the filter coefficient. The property of the conversion is determined by the coefficient value of h(l,m).

$$p'(i, j) = \sum_{l=-n}^{l=n} \sum_{m=-n}^{m=n} h(l, m) \times p(i + l, j + m) \quad (14)$$

When observing the point light source with an imaging apparatus such as a digital camera, the image observed on the image has only a certain point taking a pixel value other than zero and the other pixel values taking the value of zero on the assumption that degradation does not occur in the formation process of the image. The actual imaging apparatus includes the degradation process, and thus even if the point light source is observed, the image thereof is not a point, but a spread image. If hand shake blur occurs, the point light source generates the trajectory corresponding to the hand shake blur on the screen.

The spatial filter having a value proportional to the pixel value of the observed image for the point light source as the coefficient and having the sum of the coefficient values as one is referred to as Point Spread Function (PSF). In this example, the PSF obtained by the movement vector/hand shake blur function conversion processing part 25 is used as the PSF.

When modeling the PSF with the spatial filter h(l,m) of (2n+1) by (2n+1), where −n<l, m<n, the pixel value p(i,j) of an image without blur and the pixel value p'(i,j) of an image with blur are in relationship of equation (14) for each pixel. Only the pixel value p'(i,j) of an image with blur can actually be observed, and the pixel value p(i,j) of an image without blur must be calculated in some way.

Equation (15) is obtained by listing equation (14) for all the pixels.

$$p'(1, 1) = \sum_{l=-n}^{l=n} \sum_{m=-n}^{m=n} h(l, m) \times p(1 + l, 1 + m) \quad (15)$$

-continued $$p'(1, 2) = \sum_{l=-n}^{l=n} \sum_{m=-n}^{m=n} h(l, m) \times p(1+l, 2+m)$$

...

$$p'(1, N_n) = \sum_{l=-n}^{l=n} \sum_{m=-n}^{m=n} h(l, m) \times p(1+l, N_n+m)$$

$$p'(2, N_n) = \sum_{l=-n}^{l=n} \sum_{m=-n}^{m=n} h(l, m) \times p(2+l, N_n+m)$$

...

$$p'(N_y, N_n) = \sum_{l=-n}^{l=n} \sum_{m=-n}^{m=n} h(l, m) \times p(N_y+l, N_n+m)$$

The equations can be collectively expressed in matrix form, whereby equation (16) is obtained. P is that in which the original image is unified in raster scanning order.

$$P'=H \times P \quad (16)$$

The non-degraded image P can be obtained from the degraded image P' by calculating $P=H^{-1} \times P$ if an inverse matrix $H^{-1}$ of H exists, but generally, the inverse matrix of H does not exist. A generalized inverse matrix or a pseudo-inverse matrix exists for the matrix which inverse matrix does not exist. An example of the generalized inverse matrix is indicated by equation (17).

$$H^* = (H^t \cdot H + \gamma \cdot I)^{-1} \cdot H^t \quad (17)$$

$H^*$ is the generalized inverse matrix of H, $H^t$ is the transposed matrix of H, $\gamma$ is the scalar, and I is the unit matrix of the same size as $H^t \cdot H$. The image P in which the hand shake blur is corrected can be obtained from the observed hand shake blur image P' by calculating the equation (18) using $H^*$. $\gamma$ is a parameter for adjusting the strength of the correction. If the $\gamma$ is small, the correction process is strong, and if the $\gamma$ is large, the correction process is weak.

$$P'=H^* \times P \quad (18)$$

If the image size is 640×480, P of equation (18) becomes a matrix of 307, 200×1, and H* becomes a matrix of 307, 200×307, 200. As an extremely large matrix is obtained, it is not practical to directly use equations (17) and (18). The size of the matrix to be used for calculation is reduced through the following method.

First, in equation (18), the size of the image, which acts as the original of P, is made to a relatively small size of 63×63. In the case of the image of 63×63, P becomes a matrix of 3969×1, and H* becomes a matrix of 3969×3969. H* is a matrix for converting the entire blur image to the entire corrected image, where the product of each row of H* and P corresponds to the calculation of performing the correction of each pixel. The product of the center row of H* and P corresponds to the correction on the center pixel of the original image of 63×63 pixels. Since P is that in which the original image is unified through raster scanning order, the spatial filter of a size of 63×63 can be configured by making the center row of H* into two-dimensional through the inverse raster scanning. The spatial filter configured in this manner is referred to as a generalized inverse filter (hereinafter referred to as image restoration filter).

The blur image can be corrected by sequentially applying the spatial filter of a practical size created in the above manner to each pixel of the entire large image.

[3] Description on Image Restoration Processing Section 30

The image restoration processing section 30 includes a selector 31, an image reduction processing part 32, a filter processing part 33, a selector 34 and an image enlargement processing part 35.

As described above, the selectors 31, 34 are controlled by the hand shake blur size determining part 22. That is, the hand shake blur size determining part 22 controls the selector 31 so that the hand shake blur image v_blur is sent to the filter processing part 33 when the hand shake blur size is determined as small, and the hand shake blur image v_blur is sent to the image reduction processing part 32 when the hand shake blur size is determined as large. The hand shake blur size determining part 22 controls the selector 34 so that the image obtained by the filter processing part 33 is output as it is as the restored image when the hand shake blur size is determined as small, and the image obtained by the filter processing part 33 is sent to the image enlargement processing part 35 when the hand shake blur size is determined as large.

[3-1] When Hand Shake Blur Size is Small

When the hand shake blur size is determined as small by the hand shake blur size determining part 22, the hand shake blur image v_blur is sent to the filter processing part 33 through the selector 31. The filter processing part 33 performs the filter processing on the hand shake blur image v_blur using the image restoration filter obtained by the image restoration filter calculating section 20. The image obtained by the filter processing part 33 is output as the restored image v_stab. The filter processing part 33 is configured by a two-dimensional FIR filter and the like.

[3-2] When Hand Shake Blur Size is Large

When the hand shake blur size is determined as large by the hand shake blur size determining part 22, the hand shake blur image v_blur is sent to the image reduction processing part 32 through the selector 31. The image reduction processing part 32 reduces the hand shake blur image v_blur at the same scale as the hand shake blur signal reduction ratio Scale_x in the horizontal direction and the hand shake blur signal reduction ratio Scale_y in the vertical direction.

The reduced image obtained by the image reduction processing part 32 is sent to the filter processing part 33. The filter processing part 33 performs filter processing on the reduced image obtained by the image reduction processing part 32 using the image restoration filter obtained by the image restoration filter calculating section 20.

The image obtained by the filter processing part 33 is sent to the image enlargement processing part 35. The image enlargement processing part 35 enlarges the image obtained by the filter processing part 33 at the scale corresponding to the inverse number of each reduction ratio Scale_x and Scale_y used in the image reduction processing part 32. The image obtained by the image enlargement processing part 35 is output as the restored image v_stab.

In the above example, the hand shake blur signal reduction ratio Scale_x in the horizontal direction and the hand shake blur signal reduction ratio Scale_y in the vertical direction are both set to 1/2, but the hand shake blur signal reduction ratio Scale_x in the horizontal direction is preferably set taking the size of the hand shake blur in the horizontal direction into consideration, and the hand shake blur signal reduction ratio Scale_y in the vertical direction is preferably set taking the size of the hand shake blur in the vertical direction into consideration.

For example, if the size Sz_v of the hand shake blur in the vertical direction is less than or equal to the threshold value Th and the size Sz_h of the hand shake blur in the horizontal direction is above the threshold value Th, the hand shake blur signal reduction ratio Scale_y in the vertical direction is preferably set to 1, and the hand shake blur signal reduction ratio Scale_x in the horizontal direction is preferably set taking the size Sz_h of the hand shake blur in the horizontal direction into consideration. In this manner, the hand shake blur image does not need to be reduced in the vertical direction, and the image resolution in the vertical direction in the restored image does not degrade.

The same value Th is used for the threshold value for determining the size of the hand shake blur in the horizontal direction and the threshold value for determining the size of the hand shake blur in the vertical direction, but a threshold value of a different value may be used.

In the above example, if the hand shake blur size is determined as large, the movement vector which is the hand shake blur signal is reduced, and then the PSF is created from the reduced movement vector, but the PSF may be created from the movement vector which is the hand shake blur signal, and then the obtained PSF may be reduced.

In the above example, if the hand shake blur size is large, the original image (hand shake blur image) is reduced, the filter processing is performed on the reduced image by the image restoration filter 33, and then the image is enlarged. Thus, degradation in the image resolution of the finally obtained restored image is a concern. However, lowering in resolution by the image reduction/enlargement process can be substantially ignored since the high frequency component in the original image is lost by the hand shake blur when the hand shake blur is large.

[B] EXAMPLE 2

[1] Configuration of Hand Shake Blur Correction Processing Circuit

Figure 9:
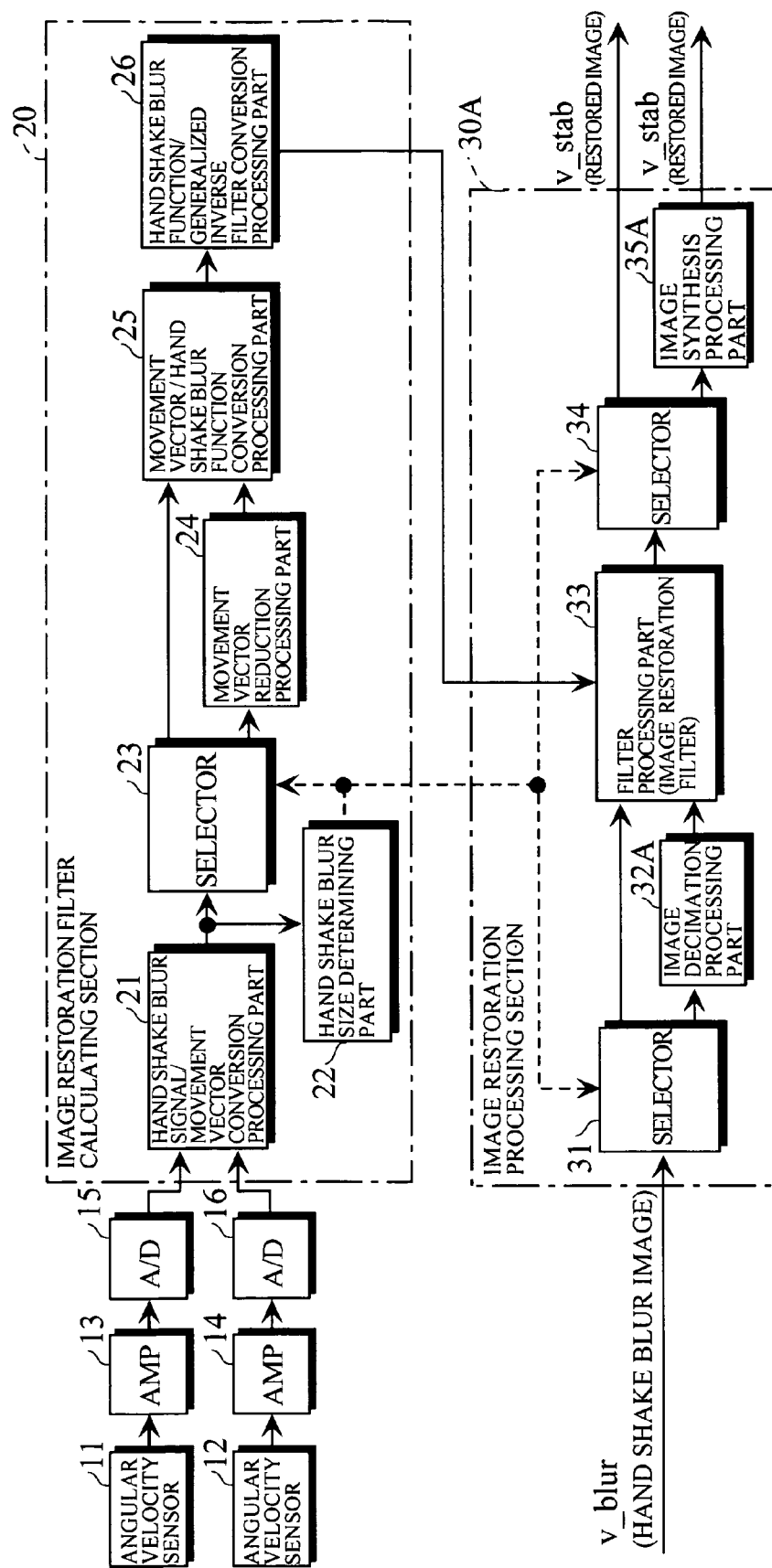
FIG. 9 is a block diagram showing a configuration of a hand shake blur correction processing circuit arranged in the digital camera.

FIG. 9 shows a configuration of the hand shake blur correction processing circuit arranged in the digital camera. In FIG. 9, the same reference characters are denoted for the components same as in FIG. 1, and thus the explanation thereof is omitted.

The hand shake blur correction processing circuit of FIG. 9 differs in the configuration of the image restoration processing section 30A compared to the hand shake blur correction processing circuit of FIG. 1.

[2] Description on Image Restoration Processing Section 30A

The image restoration processing section 30A includes the selector 31, an image decimation processing part 32A, the filter processing part 33, the selector 34, and an image synthesis processing part 35A. That is, in the image restoration processing section 30A of FIG. 9, the image decimation processing part 32A is used in place of the image reduction processing part 32 of FIG. 1, and the image synthesis processing part 35A is used in place of the image enlargement processing part 35 of FIG. 1.

The selectors 31, 34 are controlled by the hand shake blur size determining part 22. That is, the hand shake blur size determining part 22 controls the selector 31 so that the hand shake blur image v_blur is sent to the filter processing part 33 when the hand shake blur size is determined as small, and the hand shake blur image v_blur is sent to the image decimation processing part 32A when the hand shake blur size is determined as large. The hand shake blur size determining part 22 controls the selector 34 so that the image obtained by the filter processing part 33 is output as it is as the restored image when the hand shake blur size is determined as small, and the image obtained by the filter processing part 33 is sent to the image synthesis processing part 35A when the hand shake blur size is determined as large.

[2-1] When Hand Shake Blur Size is Small

When the hand shake blur size is determined a small by the hand shake blur size determining part 22, the hand shake blur image v_blur is sent to the filter processing part 33 through the selector 31. The filter processing part 33 performs the filter processing on the hand shake blur image v_blur using the image restoration filter obtained by the image restoration filter calculating section 20. The image obtained by the filter processing part 33 is output as the restored image v_stab.

[2-2] When Hand Shake Blur Size is Large

When the hand shake blur size is determined as large by the hand shake blur size determining part 22, the hand shake blur image v_blur is sent to the image decimation processing part 32A through the selector 31. The image decimation processing part 32A decomposes the hand shake blur image v_blur to the decimated image of the number corresponding to the hand shake blur signal reduction ratio Scale_x in the horizontal direction and the hand shake blur signal reduction ratio Scale_y in the vertical direction.

Figure 10:
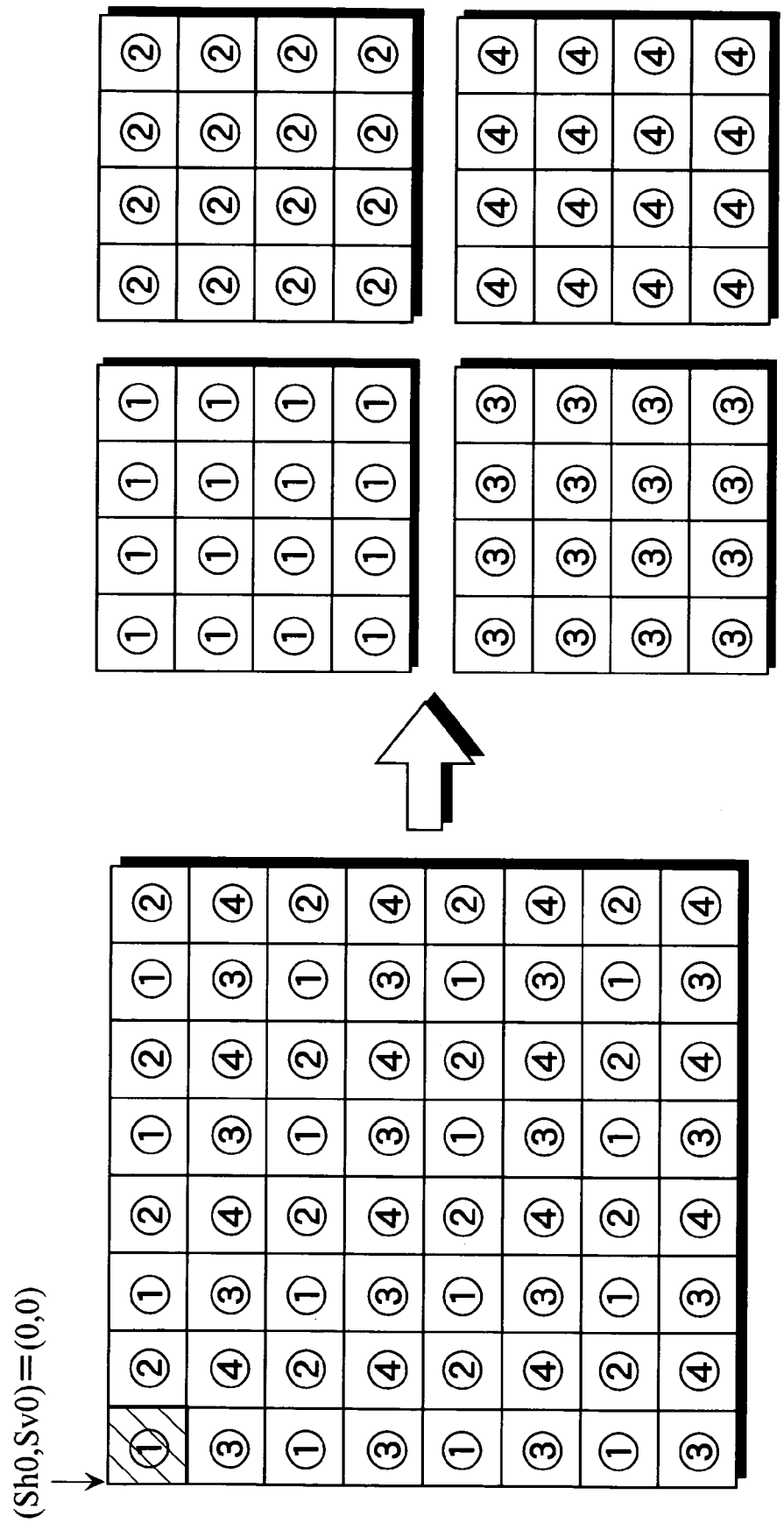
FIG. 10 is a frame format view for describing a method of generating a decimated image with an image decimation processing part 32A.

For example, if the hand shake blur signal reduction ratio Scale_x and the hand shake blur signal reduction ratio Scale_y in the vertical direction are both 1/2 (Div_x=Div_y=2 of equation (12)), the hand shake blur image v_blur on the left side is decomposed into four decimated images on the right side, as shown in FIG. 10. In this example, the hand shake blur image v_blur is decomposed into the first decimated image including pixels of odd numbered rows and odd numbered columns, the second decimated image including pixels of odd numbered rows and even numbered columns, the third decimated image including pixels of even numbered rows and odd numbered columns, and the fourth decimated image including pixels of even numbered rows and even numbered columns. The method of generating the decimated image corresponding to the hand blur signal reduction ratio Scale_x, Scale_y (Div_x, Div_y) will be hereinafter described.

The plurality of decimated images obtained by the image decimation processing part 32A is sent to the filter processing part 33. The filter processing part 33 performs the filter processing on the plurality of decimated images obtained by the image decimation processing part 32A using the image restoration filter obtained by the image restoration filter calculating section 20.

The plurality of restored images obtained by the filter processing part 33 is sent to the image synthesis processing part 35A. The image synthesis processing part 35A synthesizes the plurality of restored images obtained by the filter processing part 33 so that the pixels in each restored image are arranged at the same position as the pixel array before decimation (before decomposition). The image obtained by the image synthesis processing part 35A is output as the restored image v_stab.

[3] Description on Method of Generating Decimated Image by Image Decimation Processing Part 32A The method of generating the decimated image by the image decimation processing part 32A will now be described.

(S1) First, the pixel decimating numbers (Nh, Nv) in the horizontal direction and the vertical direction are calculated.

The pixel decimating numbers Nh, Nv are calculated based on equation (19) from Div_x, Div_y (see equation (12)) set to calculate the hand shake blur signal reduction ratio Scale_x, Scale_y in the horizontal direction and the vertical direction.

$$Nh=Div\_x-1$$

$$Nv=Div\_y-1 \quad (19)$$

For example, if Div_x=Div_y=2, then Nh=Nv=1.

(S2) The initial value (Sh0, Sv0) of the reference start pixel position (Sh, Sv) on the original image (hand shake blur image v_blur) are set. Normally, (Sh0, Sv0) are set to the pixel position (0,0) on the upper left of the original image. That is, (Sh0, Sv0)=(0,0).

(S3) The pixel values are acquired in lattice form for every Nh pixel in the horizontal direction and every Nv pixel in the vertical direction from the reference start pixel position (Sh, Sv), and the decimated image is generated. When Nh=Nv=1, the decimated image configured from pixels indicated with circled number 1 of the original image on the left side of FIG. 10 is generated.

(S4) The reference start pixel position is shifted by one pixel in the horizontal direction. That is, (Sh,Sv)=(Sh+1, Sv). Process similar to (S3) is then performed. When Nh=Nv=1, the decimated image configured from pixels indicated with a circled number 2 of the original image on the left side of FIG. 10 is generated.

(S5) The process of (S4) is repeatedly performed for the number of times corresponding to the pixel decimating number Nh in the horizontal direction. When Nh=1, the process of (S4) is only performed once.

(S6) After the component in the horizontal direction of the reference start pixel position is returned to the initial position, the reference start pixel position is shifted by one pixel in the vertical direction. That is, (Sh,Sv)=(Sh, Sv+1). Process similar to (S3) is then performed. When Nh=Nv=1, the decimated image configured from pixels indicated with a circled number 3 of the original image on the left side of FIG. 10 is generated. Thereafter, the reference start pixel position is shifted by one pixel in the horizontal direction. That is, it is updated to (Sh,Sv)=(Sh+1, Sv). Process similar to (S3) is then performed. When Nh=Nv=1, the decimated image configured from pixels indicated with a circled number 4 of the original image on the left side of FIG. 10 is generated.

(S7) The process of (S6) is repeatedly performed for the number of times corresponding to the pixel decimating number Nv in the vertical direction. When Nh=1, the process of (S6) is only performed once.

In the above example, the hand shake blur signal reduction ratio Scale_x in the horizontal direction and the hand shake blur signal reduction ratio Scale_y in the vertical direction are both set to 1/2, but the hand shake blur signal reduction ratio Scale_x in the horizontal direction is preferably set taking the size of the hand shake blur in the horizontal direction into consideration, and the hand shake blur signal reduction ratio Scale_y in the vertical direction is preferably set taking the size of the hand shake blur in the vertical direction into consideration.

For example, if the size Sz_v of the hand shake blur in the vertical direction is less than or equal to the threshold value Th and the size Sz_h of the hand shake blur in the horizontal direction is above the threshold value Th, the hand shake blur signal reduction ratio Scale_y in the vertical direction is preferably set to 1, and the hand shake blur signal reduction ratio Scale_x in the horizontal direction is preferably set taking the size Sz_h of the hand shake blur in the horizontal direction into consideration. In this manner, the hand shake blur image does not need to be decimated in the vertical direction, and the image resolution in the vertical direction in the restored image does not degrade.

The same value Th is used for the threshold value for determining the size of the hand shake blur in the horizontal direction and the threshold value for determining the size of the hand shake blur in the vertical direction, but a threshold value of a different value may be used.

In the above example, if the hand shake blur size is determined as large, the movement vector which is the hand shake blur signal is reduced, and then the PSF is created from the reduced movement vector, but the PSF may be created from the movement vector which is the hand shake blur signal, and then the obtained PSF may be reduced.

According to examples 1 and 2, the restored image having a sufficient restoration effect is obtained even if the large hand shake blur that exceeds the tap size of the image restoration filter is produced when the tap size of the image restoration filter is limited by the restriction of the hardware. Further, a sufficient restoration effect is obtained for the image with large hand shake blur even by using the image restoration filter having a small tap size, thereby contributing to reduction in cost of the hardware.

What is claimed is:

1. A hand shake blur correcting apparatus for generating an image restoration filter based on a hand shake blur signal and performing image restoration on the hand shake blur image using the generated image restoration filter; the hand shake blur correcting apparatus comprising:

a hand shake blur signal reduction means for reducing the hand shake blur signal using given reduction ratio in a horizontal direction and reduction ratio in a vertical direction;

an image restoration filter generating means for generating the image restoration filter based on the hand shake blur signal reduced by the hand shake blur signal reduction means;

an image reduction means for reducing the hand shake blur image at the reduction ratio same as reduction ratios in the horizontal direction and the vertical direction used in reducing the hand shake blur signal in the handshake blur signal reduction means;

an image restoration means for performing image restoration on the handshake blur image reduced by the image reduction means using the image restoration filter generated by the image restoration filter generating means; and an image enlargement means for generating the restored image for the hand shake blur image by enlarging the restored image restored by the image restoration means.

2. The hand shake blur correcting apparatus according to claim 1, wherein the hand shake blur signal reduction means determines the reduction ratio in the horizontal direction and the reduction ratio in the vertical direction set in advance, and reduces the hand shake blur signal using the determined reduction ratio in the horizontal direction and reduction ratio in the vertical direction.

3. The hand shake blur correcting apparatus according to claim 1, wherein the hand shake blur signal reduction means determines the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

4. A hand shake blur correcting apparatus for generating an image restoration filter based on a hand shake blur signal and performing image restoration on the hand shake blur image using the generated image restoration filter; the hand shake blur correcting apparatus comprising:
- a hand shake blur signal reduction means for reducing the hand shake blur signal using given reduction ratio in a horizontal direction and reduction ratio in a the vertical direction;
- an image restoration filter generating means for generating the image restoration filter based on the hand shake blur signal reduced by the hand shake blur signal reduction means;
- an image decomposition means for decomposing the hand shake blur image into a plurality of decimated images;
- an image restoration means for performing image restoration on each decimated image decomposed by the image decomposition means using the image restoration filter generated by the image restoration filter generating means; and
- an image synthesis means for generating the restored image for the hand shake blur image by synthesizing each restored image restored by the image restoration means.

5. The handshake blur correcting apparatus according to claim 4, wherein the hand shake blur signal reduction means determines the reduction ratio in the horizontal direction and the reduction ratio in the vertical direction set in advance, and reduces the hand shake blur signal using the determined reduction ratio in the horizontal direction and reduction ratio in the vertical direction.

6. The hand shake blur correcting apparatus according to claim 4, wherein the hand shake blur signal reduction means determines the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

7. The hand shake blur correcting apparatus according to claim 4, wherein the image decomposition means decomposes the hand shake blur image into decimated images of the number taking the reduction ratios in the horizontal direction and the vertical direction used in reducing the hand shake blur signal by the hand shake blur signal reduction means into consideration.

8. A handshake blur correcting apparatus for generating an image restoration filter based on a hand shake blur signal and performing image restoration on the hand shake blur image using the generated image restoration filter; the hand shake blur correcting apparatus comprising:
- a hand shake blur size determining means for determining whether the hand shake blur size is large or small by comparing the hand shake blur signal with a predetermined threshold value
- a first hand shake blur correcting means for executing the hand shake blur correcting process by a first mode when the hand shake blur size is determined as small by the hand shake blur size determining means; and
- a second hand shake blur correcting means for executing the hand shake blur correcting process by a second mode when the hand shake blur size is determined as large by the handshake blur size determining means: wherein the first hand shake blur correcting means includes,
- a first image restoration filter generating means for generating an image restoration filter based on the hand shake blur signal, and
- a first image restoration means for performing image restoration on the hand shake blur image using the image restoration filter obtained by the first image restoration filter generating means;

the secondhand shake blur correcting mean a includes,
- a hand shake blur signal reduction means for reducing the hand shake blur signal using given reduction ratio in a horizontal direction and reduction ratio in a vertical direction,
- a second image restoration filter generating means for generating an image restoration filter based on the hand shake blur signal reduced by the hand shake blur signal reduction means,
- an image reduction means far reducing the hand shake blur image at reduction ratios same as the reduction ratios in the horizontal direction and the vertical direction used in reducing the hand shake blur signal by the hand shake blur signal reduction means,
- a second image restoration means for performing image restoration on the hand shake blur image reduced by the image reduction means using the image restoration filter generated by the second image restoration filter generating means, and
- an image enlargement means for generating the restored image for the hand shake blur image by enlarging the restored image restored by the second image restoration means.

9. The hand shake blur correcting apparatus according to claim 8, wherein the hand shake blur signal reduction means determines the reduction ratio in the horizontal direction and the reduction ratio in the vertical direction set in advance, and reduces the hand shake blur signal using the determined reduction ratio to the horizontal direction and reduction ratio in the vertical direction.

10. The hand shake blur correcting apparatus according to claim 8, wherein the hand shake blur signal reduction means determines the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

11. The handshake blur correcting apparatus for generating an image restoration filter based on a hand shake blur signal and performing image restoration on the hand shake blur image using the generated image restoration filter; the hand shake blur correcting apparatus comprising:
- a handshake blur size determining means for determining whether the hand shake blur size is large or small by comparing the hand shake blur signal with a predetermined threshold value;
- a first hand shake blur correcting means for executing the hand shake blur correcting process by a first mode when the hand shake blur size is determined as small by the hand shake blur size determining means; and
- a second hand shake blur correcting means for executing the hand shake blur correcting process by a second mode when the hand shake blur size is determined as large by the hand shake blur size determining means; wherein the first hand shake blur correcting means includes,
- a first image restoration filter generating means for generating an image restoration filter based on the hand shake blur signal, and
- a first image restoration means for performing image restoration on the hand shake blur image using the image restoration filter obtained by the first image restoration filter generating means;

the second hand shake blur correcting means includes,
- a hand shake blur signal reduction means for reducing the hand shake blur signal using given reduction ratio in a horizontal direction and reduction ratio in a vertical direction,
- a second image restoration filter generating means for generating an image restoration filter based on the hand shake blur signal reduced by the hand shake blur signal reduction means,
- an image decomposition means for decomposing the hand shake blur image into a plurality of decimated images,
- a second image restoration means for performing image restoration on each decimated image decomposed by the image decomposition means using the image restoration filter generated by the second image restoration filter generating means, and
- an image synthesis means for generating the restored image for the hand shake blur image by synthesizing each restored image restored the second image restoration means.

12. The hand shake blur correcting apparatus according to claim 11, wherein the hand shake blur signal reduction means determines the reduction ratio in the horizontal direction and the reduction ratio in the vertical direction set in advance, and reduces the hand shake blur signal using the determined reduction ratio in the horizontal direction and reduction ratio in the vertical direction.

13. The hand shake blur correcting apparatus according to claim 11, wherein the handshake blur signal reduction means determines the reduction ratio in the horizontal direction and the reduction ratio in the vertical direction based on the size in the horizontal direction and the size in the vertical direction of the hand shake blur signal, and reduces the hand shake blur signal using the determined reduction ratio in the horizontal direction and reduction ratio in the vertical direction.

14. The hand shake blur correcting apparatus according to claim 11, wherein the image decomposition means decomposes the hand shake blur image into decimated images of the number taking the reduction ratios in the horizontal direction and the vertical direction used in reducing the hand shake blur signal by the hand shake blur signal reduction means into consideration.

* * * * *